United States Patent
Casagrande (10) Patent No.: US 11,976,941 B2
(45) Date of Patent: May 7, 2024

(54) METHOD AND SYSTEM FOR MEASURING SPEED AND DISTANCE OF A BICYCLE

(71) Applicant: The Swatch Group Research and Development Ltd, Marin (CH)

(72) Inventor: Arnaud Casagrande, Bole (CH)

(73) Assignee: The Swatch Group Research and Development Ltd, Marin (CH)

( * ) Notice: Subject to any disclaimer, the term of this patent is extended or adjusted under 35 U.S.C. 154(b) by 337 days.

(21) Appl. No.: 17/442,390

(22) PCT Filed: Mar. 9, 2020

(86) PCT No.: PCT/EP2020/056163
§ 371 (c)(1),
(2) Date: Sep. 23, 2021

(87) PCT Pub. No.: WO2020/193107
PCT Pub. Date: Oct. 1, 2020

(65) Prior Publication Data
US 2022/0170762 A1   Jun. 2, 2022

(30) Foreign Application Priority Data
Mar. 28, 2019  (EP) .................................... 19165713

(51) Int. Cl.
*G01P 3/48*    (2006.01)
*G01C 22/00*   (2006.01)
*G01P 3/487*   (2006.01)

(52) U.S. Cl.
CPC ............ *G01C 22/002* (2013.01); *G01P 3/487* (2013.01)

(58) Field of Classification Search
None
See application file for complete search history.

(56) References Cited

U.S. PATENT DOCUMENTS 3,723,966 A * 3/1973 Mueller ........... G06K 19/07764
340/447
7,495,549 B2 * 2/2009 Acres ....................... B62J 6/015
340/432

(Continued)

FOREIGN PATENT DOCUMENTS

DE    296 15 910 U1    12/1997
DE    198 38 876 A1     3/2000

(Continued)

OTHER PUBLICATIONS

International Search Report dated Jun. 29, 2020 in PCT/EP2020/056163 filed Mar. 9, 2020, citing documents AA-AI and AO-AS therein, 4 pages.

*Primary Examiner* — Brandi N Hopkins
*Assistant Examiner* — Nigel H Plumb
(74) *Attorney, Agent, or Firm* — Oblon, McClelland, Maier & Neustadt, L.L.P.

(57) ABSTRACT

A method and system for measuring a physical parameter, such as speed and/or distance travelled by a bicycle, includes a permanent magnet disposed on a front fork and a measuring circuit with a magnetic sensor disposed on a rim of the wheel at the same distance from the wheel axis of rotation as the magnet. The sensor passes in front of the magnet to generate an induced voltage pulse at each passage. The induced voltage is rectified and stored on a capacitor. Energy recovery during the sensor passing in front of the magnet allows powering of the measuring circuit. The parameter is calculated in the calculation unit clocked by an oscillator based on the received induced voltage pulses by knowing the bicycle wheel diameter. Measurements performed from the measuring circuit are transmitted to a portable device carried by the user or mounted on the bicycle to be displayed.

24 Claims, 2 Drawing Sheets

(56) References Cited

U.S. PATENT DOCUMENTS

| | | |
|---|---|---|
| 9,424,739 B2 * | 8/2016 | Pennisi .................. H02J 50/20 |
| 2005/0156590 A1 | 7/2005 | Nagae |
| 2010/0180664 A1 * | 7/2010 | Wilhelmy ................ G01D 3/08 |
| | | 73/7 |
| 2011/0018526 A1 * | 1/2011 | Windmueller ......... G01D 21/00 |
| | | 324/176 |
| 2013/0285707 A1 | 10/2013 | Pennisi |
| 2013/0288621 A1 | 10/2013 | Pennisi |
| 2017/0115319 A1 * | 4/2017 | Ookubo .................. B62J 45/20 |

FOREIGN PATENT DOCUMENTS

| | | |
|---|---|---|
| DE | 200 14 262 U1 | 4/2001 |
| DE | 20 2012 011 461 U1 | 1/2013 |
| DE | 10 2014 203 142 A1 | 8/2015 |

* cited by examiner

METHOD AND SYSTEM FOR MEASURING SPEED AND DISTANCE OF A BICYCLE

TECHNICAL FIELD OF THE INVENTION

The invention concerns a method for measuring at least one physical parameter, such as a speed and/or a distance travelled by a bicycle.

The invention also relates to a system for measuring at least one physical parameter, such as a speed and/or a distance travelled by a bicycle for the implementation of the measurement method.

STATE OF THE ART

In order to perform a measurement of a physical parameter, such as a speed of a vehicle having, for example, two wheels, a Bluetooth-type tachometer can be used, which is generally provided with a battery for the power supply thereof. It is also known to use a speed measuring device with at least one permanent magnet disposed on a wheel of the vehicle and a magnetic sensor fastened for example on a fork of the vehicle to determine the passage of the magnet opposite to the sensor during the rotation of the vehicle wheel. It is generally necessary to provide such a speed measuring device with a specific energy source, which complicates the structure of the device to be placed on the vehicle wheel and the manner of performing the speed measurement.

The U.S. Pat. No. 5,335,188 describes a device for managing and comparing past and present ideal performances, on an exercise machine, such as a bicycle. To do this, there is provided at least one permanent magnet linked to the bicycle wheel, and a movement sensor on the bicycle fork to transmit measurement signals by cable to a microprocessor unit disposed on the bicycle handlebar. A battery is provided for powering the device. The movement sensor can detect the passage of the permanent magnet during the rotation of the wheel. This movement sensor acts as a magnetic sensor to determine the speed of rotation of the wheel at the passage of the magnet in the vicinity of said sensor and deduce the travelled distance therefrom. As previously mentioned, an energy source, such as a battery, must be used for the operation of the measuring device, which complicates the structure of the device to be placed on the bicycle to perform the speed measurement.

The patent application US 2015/0285657 A1 describes a device for managing activity and registration of a bicycle. There is provided at least one magnet disposed on the spokes of a bicycle wheel, a control unit mounted on a bicycle fork, and a smartphone placed on the handlebar of the bicycle. The control unit comprises in particular a Hall effect sensor to determine the passage of the magnet during the rotation of the bicycle wheel, a microprocessor with proprietary software identical to the smartphone software, a memory to store all measurements performed by the sensor(s). The device allows measuring the speed of the bicycle and the travelled distance. However, an energy source must be provided for the control unit, which complicates the structure of the device to be placed on the bicycle to perform the speed measurement.

The patent application US 2011/0018526 A1 describes a measuring device for measuring the relative speed of rotation of a rotor which rotates relative to a stator at a wheel of a vehicle. An inductive pulse generator, which is supported by the stator, comprises an induction coil in which an electrical voltage, which represents a signal for measuring the rotational speed of the rotor, is induced by the rotation of the rotor. A permanent magnet is provided during the passage of the induction coil. An emitter device, powered with electrical energy by the voltage induced by the inductive pulse generator, wirelessly transmits at least one rotational speed measurement signal to a receiver device. No precise arrangement of a magnetic sensor and a permanent magnet mounted on a bicycle for measuring a speed and a travelled distance is described.

The patent application US 2005/0156590 A1 describes a measuring device for measuring the passage of a magnet fastened to a spoke of a bicycle wheel opposite to a measuring circuit with magnetic sensor fastened on the fork of the bicycle at the same distance from the axis of rotation of the wheel as the magnet placed on the spoke. However, calculations are not specifically defined in a processing unit clocked by a precise low-power oscillator.

The patent application DE 296 15 910 U1 describes sports equipment. It could be a tachometer with odometer on a bicycle to indicate the travelled distance and the instantaneous speed. However, a speed detection is mainly described for roller skates, which comprise magnets on each wheel and a sensor which detects their passage in order to transmit the measurement data to a receiver of a display device in which it is calculated in particular the speed.

The patent application DE 200 14 262 U1 describes an energy-autonomous speed and temperature sensor, which comprises an inductive rotational speed sensor, a semiconductor temperature sensor, a regulator, an energy accumulator, an associated manager and a radio emitter. The voltage pulses from the rotational speed sensor are rectified and amplified so that a controller can evaluate the pulses to measure the rotational speed. The rectified rotational speed pulses are stored cumulatively in an energy accumulator consisting of capacitors. Nothing relates to a measurement of speed or distance travelled by a bicycle.

The U.S. Pat. No. 9,424,739 B2 describes a self-powered wireless system. A magnet interacts with an inductor to generate a trigger and power signal. A transmission of a measurement signal can be performed. This device can be mounted on a vehicle, but nothing is indicated of such an arrangement on a bicycle with a magnet and with a measuring circuit disposed on the bicycle at a wheel.

The patent application DE 20 2012 011 461 U1 describes an electronic device for detecting the speed and mileage of a bicycle by using at least one permanent magnet disposed on a spoke of a wheel and a sensor circuit, such as a Hall generator disposed on a bicycle frame. The sensor circuit detects the passage of the permanent magnet and takes a power voltage for the electronic device. A calculation of the travelled distance and the average speed can be performed. A data transmission unit is provided for the transmission of data to at least one receiver. The sensor circuit is not adapted to easily determine several quantities or physical parameters by a simple power supply following the passage of the permanent magnet during the rotation of the bicycle wheel.

The patent application DE 198 38 876 A1 describes an electronic tachometer, which is electrically powered by the passage of a magnet in front of an induction coil. The voltage provided by the induction coil allows charging an energy storage capacitor by a voltage rectification and stabilisation circuit. The induction coil can detect the variations in voltages induced by the passage of several permanent magnets and as a rotation sensor. A speed of the wheel can be determined, and a data transmission can be performed by radio link to an evaluation unit. Nothing refers to a bicycle.

The patent application US 2010/0180664 A1 describes a rotary transducer and a method for monitoring the wear of the transducer. The rotary transducer has a detector device having a measuring sensor to generate a measurement signal representative of the angular position and the speed of an object connected to the rotary transducer. A monitoring device is connected to the measuring sensor to transmit data and to emit a signal of wear condition of the rotary transducer, based on the measurement signal. Nothing refers to a bicycle.

The U.S. Pat. No. 7,495,549 B2 and the patent application US 2017/0115319 A1 describe a device for managing activity and registration of a bicycle. The device allows determining a slope and an elevation by means of an accelerometer combined with a barometer, but nothing in relation to a measuring circuit provided with an inclinometer disposed at a wheel of a bicycle.

The U.S. Pat. No. 3,723,966 A and the patent application DE 10 2014 203142 A1 describe a device for determining the pressure of a tyre of a wheel of a vehicle, either by a battery-powered pressure sensor placed on the wheel rim or by a pressure sensor disposed on the wheel and powered by a wireless communication. No connection is defined with a measuring circuit measuring a speed or distance travelled by the vehicle.

Other physical parameters can be measured on a bicycle. This can be the measurement of the tyre pressure, the ground type detection, the ground temperature, the angular acceleration by an accelerometer, or other types of measurement. In the case of measuring the tyre pressure, a pressure sensor circuit, which is placed on the rim of the wheel at the valve hole, can be provided. This pressure sensor circuit is powered by a battery and has the possibility to wirelessly communicate measurement signals performed as the Hutchinson Connec'Tires product. However, a battery must be provided to power such a sensor circuit, which constitutes a drawback.

SUMMARY OF THE INVENTION

Therefore, the invention aims to overcome the drawbacks mentioned above in order to simplify the measurement of at least one physical parameter, such as a speed and/or a travelled distance of a vehicle by providing, with a minimum of electrical energy, the information for example of the speed and/or travelled distance by wireless transmission to a portable device.

To this end, the invention concerns a method for measuring at least one physical parameter of a vehicle with at least one wheel, which comprises the features of independent claims 1 and 2.

Particular steps of the measurement method are defined in dependent claims 3 to 17.

An advantage of the measurement method according to the invention lies in the fact that at least one permanent magnet is mounted on a frame or a fork of the vehicle, such as a bicycle, and that a measuring circuit with magnetic sensor is disposed on a wheel, for example on a spoke of a bicycle wheel or on the rim, so that the magnetic sensor of the measuring circuit can pass in the vicinity of the magnet during the rotation of the wheel. Thus, an energy recovery, during the passage of the magnetic sensor of the measuring circuit in front of the magnet, is performed in the measuring circuit with a rectifier and a smoothing capacitor. The recovered energy allows powering the electronic components of the measuring circuit.

At each detection of the passage of the magnetic sensor in front of the magnet, a measurement of the speed of the vehicle, such as a bicycle, can be easily performed in a calculation unit of the measuring circuit, clocked by a timepiece quartz oscillator operating at low voltage. A direct transmission by a radiofrequency signal, for example Bluetooth (BLE), of the performed measurement can be made from the measuring circuit to be received by a portable device carried by the user of the vehicle or disposed on the handlebar of the vehicle. This portable device can be a mobile phone or a headset to provide an audio signal to the user or an electronic tablet placed on the handlebar in order to display at least the speed of the bicycle, and a travelled distance by integration of the speed measurement.

Advantageously, the measuring circuit can comprise at least two magnetic sensors of a measuring circuit, for example each disposed on a respective spoke of the front wheel of the bicycle and preferably at 180° from each other or on the rim of the wheel. This allows recovering more energy already during a complete rotation of the bicycle wheel and enabling the measurement of speed and/or distance travelled by the bicycle. A calibration of the diameter of the bicycle wheel and of the fixing angle of the measuring circuit can be performed initially by a transmission from the portable device to the measuring circuit. A storage of these data in the measuring circuit allows, upon activation of the measurement system, measuring the speed of the bicycle at least after one complete revolution of the bicycle wheel, and subsequently the travelled distance.

Advantageously, two magnetic sensor measuring circuits can be provided to be disposed respectively on each side on the rim of the front bicycle wheel. In this case, two permanent magnets are mounted on the front fork of the bicycle to be each disposed opposite to a respective magnetic sensor of the measuring circuits at each passage of the measuring circuits during the rotation of the bicycle wheel. Preferably, the two measuring circuits are mounted in identical positions on the rim of the front wheel, even at 180° from each other, but on two different sides. Measuring signals can be transmitted by both measuring circuits to a portable device.

Alternatively, all calculations and calibrations can be operated and stored in the portable device. In this case, the measuring circuit(s) are advantageously further simplified and only transmit the wheel passage pulses over time, and the total of these impulses, and possibly the gross angle of inclination of the sensor. The calibration is supported by the portable device by rolling, for example, on a measured course or by entering measured inclination and diameter values.

By means of the measuring circuit(s), it is possible by the succession of voltage pulses induced over time, supplied by each magnetic sensor, to calculate an instantaneous speed, a maximum speed over a determined period of time and an average speed in the calculation unit. In addition, by integration into the calculation unit, the distance travelled during a determined period of time can be easily determined. All measurements can be stored to be able to be transmitted on request and depending on the power voltage level of the measuring circuit following energy recovery from the passage of the magnetic sensor(s) opposite to the permanent magnet(s).

Other parameters can be measured and wirelessly transmitted by the measuring circuit(s) to a portable device based on the energy extracted at the passage opposite to the permanent magnet(s). This may be tyre pressure measurement from a pressure sensor circuit with a power supply by the magnetic sensor measuring circuit.

Advantageously, the measuring circuit is mounted on the tyre or on the rim of the front wheel, even of the rear wheel if the permanent magnet is mounted on a rear portion of the frame. The antenna onboard the tyre or the rim becomes rotating. This allows, by synchronisation with the physical position given by the position of the magnet, also to provide measurable information through the propagation properties of the RF medium. These can be the Doppler speed, the Synthetic Aperture Radar (SAR) measurements.

To this end, the invention also concerns a system for measuring at least one physical parameter of a vehicle with at least one wheel, such as a bicycle for implementing the measurement method, which comprises the features mentioned in independent claim 18.

Particular embodiments of the measuring system are defined in dependent claims 19 to 24.

BRIEF DESCRIPTION OF THE FIGURES

The aims, advantages and features of a method and system for measuring at least one physical parameter of a vehicle with at least one wheel, will appear better in the following description based on at least one non-limiting embodiment. illustrated by the drawings in which.

DETAILED DESCRIPTION OF THE INVENTION

In the following description, reference is made to a method and a system for measuring at least one physical parameter, such as a speed and/or a distance travelled by a vehicle with at least one wheel, such as a bicycle. All electronic components, which are well known to a person skilled in the art in this technical field, are only described in a simplified manner. The vehicle may for example be a two-wheeled bicycle so as to be set in movement by a user on a path, for example on a road or in the forest.

Figure 1:
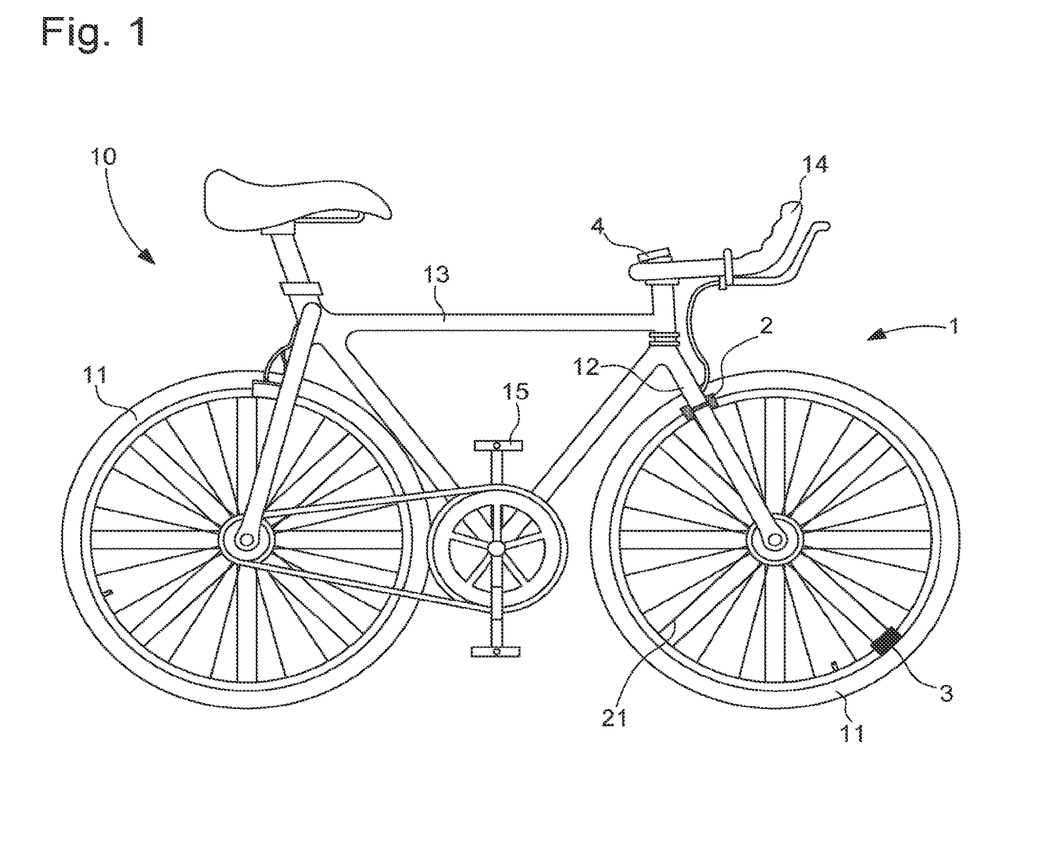
FIG. 1 is a side view of a vehicle, for example with two wheels, such as a bicycle provided with the system for measuring at least one physical parameter of the bicycle according to the invention.
Figure 2:
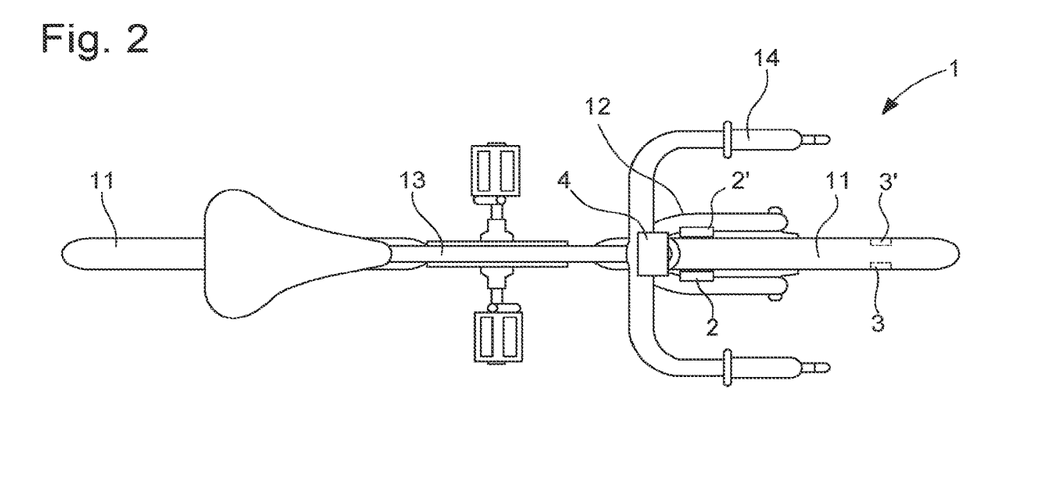
FIG. 2 is a top view of a vehicle, for example with two wheels, such as a bicycle provided with a variant of the system for measuring at least one physical parameter of the bicycle according to the invention.

FIGS. 1 and 2 represent a side and top view of a bicycle 10 with two wheels 11. The front wheel 11 is mounted freely rotating at one end of a front fork 12. This front fork 12 is mounted in a front portion of the bicycle frame 13 to be able to turn the front wheel 11 of the bicycle. The fork 12 is connected at another end to a handlebar 14. A crankset 15 which can be actuated by the two feet of a user is provided in connection with a chain to drive the rear wheel 11 in rotation on a rear portion of the frame 13.

A measurement system 1 is also mounted on the bicycle 10 for measuring at least one physical parameter, such as a speed and/or a travelled distance of the bicycle in use. The measurement system 1 essentially comprises at least one permanent magnet 2 placed on a rear portion of the frame 13 or on a front fork 12, and at least one measuring circuit 3 placed on a front or rear wheel 11. Preferably, the permanent magnet 2 is placed on the front fork 12 and a measuring circuit 3 is mounted on a rim or tyre of the front wheel 11, or even on a spoke 21 of the front wheel.

The measurement system 1 can also comprise at least one portable device 4 to receive, for example, measurement information of speed and/or distance travelled by the bicycle from the measuring circuit 3. Preferably, the measuring circuit 3 is placed on one side of the rim of the front wheel 11. The permanent magnet 2 is disposed on the front fork 12 at the same distance from the axis of rotation of the front wheel 11 as the measuring circuit 3 to be opposite to the measuring circuit 3 at its passage during the rotation of the front wheel 11.

It can also be provided to mount at least two measuring circuits 3, 3' placed on the rim of the front wheel 11 each on an opposite side of the rim, and two permanent magnets 2, 2' at the same distance from the axis of rotation of the front wheel 11. The permanent magnets 2, 2' are each opposite to one of the respective measuring circuits 3, 3' at their passage in front of the permanent magnets 2, 2'. The measuring circuits 3, 3' can be mounted at the same position on two different sides of the rim or of the tyre of the front wheel 11, or even at 180° from each other on two different sides or on the same side with a single permanent magnet 2 useful in this case. It can also be considered to place the measuring circuits 3, 3' each on a spoke 21 of the front wheel 11.

Figure 3:
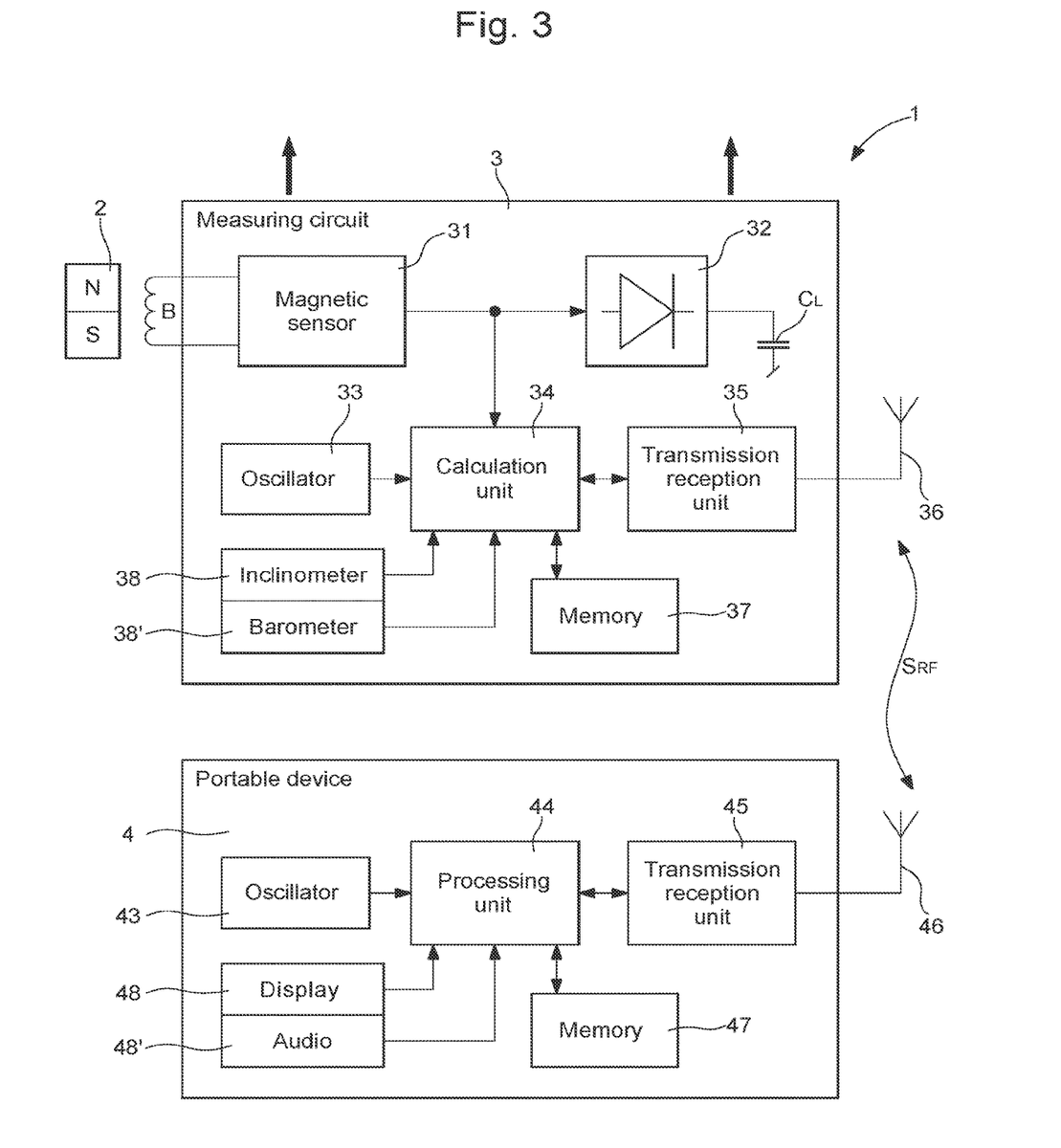
FIG. 3 represents a simplified block diagram of the electronic components of the measurement system of at least one physical parameter of a vehicle with at least one wheel according to the invention.

In the case of a single measuring circuit 3 used as shown in FIG. 3, this measuring circuit 3 mainly comprises a magnetic sensor 31 to sense its passage in front of a permanent magnet 2 in particular by a coil B, a rectifier with at least one diode 32 to rectify the induced voltage sensed by the coil B of the magnetic sensor 31, and a smoothing capacitor $C_L$ to store the energy recovered following the rectifier 32. The energy recovered and stored on the smoothing capacitor $C_L$ allows providing a power supply to the electronic components of the measuring circuit 3.

The measuring circuit 3 also essentially comprises a calculation unit 34 linked directly at the output of the magnetic sensor 31 to perform the calculation of a physical parameter, such as the speed and/or the travelled distance of the bicycle in use. The calculation unit 34, which may be a processor, is clocked by an oscillator 33, which may be a timepiece quartz or MEMS oscillator. Each magnetic pulse at its passage in front of the permanent magnet 2 in the vicinity of the magnetic sensor 31, and at a rate, over time, generated by the oscillator 33, allows the calculation unit 34 to easily calculate the speed. In addition, it is also possible to easily obtain the distance travelled by integration.

It can be considered to calculate in the calculation unit 34 an instantaneous speed, a maximum speed over a determined period of time and an average speed. A distance travelled by the bicycle can also be determined in calculation unit 34 over a determined period of time.

The performed measurements can be transmitted by an antenna 36 of a transmission-reception unit 35 connected at the output of the calculation unit 34, to a portable device 4. The transmission-reception unit 35 can be of the BLE type in advertising mode for transmitting short distance radiofrequency signals $S_{RF}$ to the portable device 4. This portable device 4 can be a portable telephone mounted on the handlebar of the bicycle, or an electronic tablet, or even an electronic headset to report the measurements in audio form to the user.

In a variant, the calculation unit 34 of the measuring circuit 3 can be provided to determine the times of its passage in front of the fixed permanent magnet 2 opposite to the magnetic sensor 31 based on the induced voltage pulses provided by the magnetic sensor 31. Then, the transmission-reception unit 35 of the measuring circuit 3 transmits via the antenna 36 data relating to the times of the passage of the magnetic sensor 31 in front of the permanent magnet 2 to the portable device 4. A calculation of a speed and/or a travelled distance of the vehicle is performed directly in a processing unit 44 of the portable device 4.

This speed v of the bicycle is therefore obtained by knowing the time t between two induced voltage peaks if there is only one magnetic sensor and a single permanent magnet 2 and the dimension of the bicycle wheel with a diameter D. This gives $v=\pi \cdot D/t$. With two measuring circuits 3, 3' for example disposed on the rim at 180° from each other, the speed can therefore be $v=\pi \cdot D/(2 \cdot t)$.

Of course, for the exact calculation of the speed of the bicycle, the diameter D of the front wheel 11 and possibly the angle of inclination of the measuring circuit 3 with the magnetic sensor 31 relative to the horizontal must be intrinsically calibrated by the user of the bicycle in particular via the portable device 4 explained below.

As represented in FIG. 3, it should be noted that the measuring circuit 3 can comprise a memory 37 connected to the calculation unit 34 to store the measurements of speed and distance travelled over time. It can be a non-volatile memory of the FLASH type to keep in memory the data in the case of a power failure, in particular when the bicycle is stationary or when the voltage stored on the smoothing capacitor $C_L$ is no longer sufficient.

The measuring circuit 3 can also include other sensors. An inclinometer 38 may be provided to allow, by integration, to calculate in the calculation unit 34, the elevation performed by the bicycle in use, or an instantaneous lateral inclination of the bicycle. The inclinometer can be composed of an accelerometer in the measuring circuit 3. The accelerometer provides a sinusoidal measuring signal during the rotation of the wheel with a maximum acceleration at the passage from the vertical to the highest point and the minimum at the lowest point in contact with the path. The magnetic sensor 31 of the measuring circuit 3 detects the passage of the magnet 2 by shifting the max and min values of the measurement signal of the accelerometer. The measurement of the passage time of the magnetic sensor 31 opposite to the permanent magnet 2 allows calculating the elevation performed by the bicycle in use, or an instantaneous lateral inclination of the bicycle relative to the ground.

The measured data of the positive elevation and the negative elevation are stored in the non-volatile memory 37, as are the speed and the travelled distance. A barometer or altimeter 38' can also be provided to measure the atmospheric pressure. These sensors can be useful in the practice of some downhill sports. The inclinometer 38 combined with the barometer 38' can be calibrated via the portable device 4 in communication with the measuring circuit 3.

The measuring system 1 can also comprise a pressure sensor circuit which is not represented, disposed at a tyre valve on the wheel rim to measure the tyre pressure. The power supply can be provided by the measuring circuit 3 by a wireless communication and the pressure measurement of the pressure sensor circuit is transmitted to the measuring circuit 3. This pressure measurement can be stored in the measuring circuit 3 or also transmitted to the portable device 4.

A detection of the type of ground can be determined by the measurement system 1. A temperature sensor of the measuring circuit 3 to measure the temperature of the ground, an accelerometer to measure the angular acceleration can be provided.

Thanks to the measuring circuit 3 mounted on the tyre or on the rim of the front wheel of the bicycle, or even of the rear wheel of the bicycle, a synchronisation can be performed with the physical position given by the position of the magnet 2. Thus this also allows providing measurable information through the propagation properties of the RF medium. These can be the Doppler speed, the Synthetic Aperture Radar (SAR) measurements.

When the bicycle stops or rolls at too low speed, it is planned to deactivate the transmission-reception unit 35 if the power voltage from the smoothing capacitor $C_L$ drops below a first threshold voltage. When this supply voltage drops even lower below a second critical voltage threshold, the entire measuring circuit 3 is deactivated by having previously stored all measurement data in the non-volatile memory 37. Thus, these stored data may again be available to be transmitted to the portable device 4 when the power voltage is sufficient above the first low voltage threshold with the bicycle in use.

Of course, in order to have a sufficient operating voltage for the entire measuring circuit 3 even with a low speed, this depends on the dimensioning of the coil B of the magnetic sensor 31 with a determined number of turns and on the strength of the magnetic field generated by the permanent magnet(s) 2. The distance between the permanent magnet(s) 2 at the passage of the magnetic sensor 31 must be as small as possible. With a measuring circuit 3 and a permanent magnet 2, a bicycle speed just above, for example 2 km/h may be sufficient for adequate energy storage on the smoothing capacitor $C_L$.

The portable device 4 can be, as explained above, a mobile phone carried by the user of the bicycle or fastened on a portion of the bicycle, for example on the handlebar of the bicycle. It can also be an electronic tablet also fastened on the handlebar of the bicycle, or an electronic headset worn on the ear by the user to report the measurements of speed and distance travelled by an audio signal.

The portable device 4 comprises a transmission-reception unit 45 to establish a communication of signals $S_{RF}$ by an antenna 46 with the measuring circuit 3. The portable device 4 also comprises an oscillator 43, which can also be a timepiece quartz oscillator or other, to clock a data processing unit 44 connected to the transmission-reception unit 45. A non-volatile memory 47 allows storing the measurement information received from the measuring circuit or calculated in the portable device 4, and to provide parameterisation or calibration data to the processing unit for a transmission to the measuring circuit 3 by the transmission-reception unit 45. At least one display element 48, for example liquid-crystal or LED display element, may also be provided to report to the user the speed of the bicycle and the travelled distance when receiving the signals $S_{RF}$ from the measuring circuit 3.

In the case of a portable device 4 in the form of an electronic headset, an audio element 48' such as a loudspeaker may be provided. There may therefore be both the audio element 48' and the display element 48 for the portable device 4 in the form of the mobile phone or the electronic tablet. Thus, information of measurements performed by the measuring circuit 3 can be provided to the user in audio form using speech synthesis.

It should also be noted that since the distance between the portable device 4 which is fastened on the handlebar and the measuring circuit 3 is small, it is possible to greatly reduce the power of the BLE signal $S_{RF}$. This thus allows increasing the operating time of the measuring circuit 3 when the bicycle is a moment when it is stopped.

The magnetic sensor 31 of the measuring circuit may be constituted in a simplified manner only by the coil with several turns connected to the calculation unit 34. In addition, two measuring circuits 3, 3' may be provided, shown in FIG. 2 positioned for example at the same position on the wheel, but on two different sides of the rim or of the tyre of the wheel 11. These two measuring circuits 3, 3' can also be disposed at 180° from each other on the same side or on two different sides of the rim or the tyre of the wheel 11. This allows ensuring the proper operation of at least one of the two measuring circuits 3, 3' with magnetic sensors for the accurate measurement of the speed and the travelled distance in measuring circuit 3 or another physical quantity. The magnetic sensor 31 can also be a Hall effect sensor.

From the description which has just been made, several variants of a method and system for measuring at least one physical parameter, such as a speed and/or a distance travelled by a vehicle with at least one wheel, can be designed by a person skilled in the art without departing from the scope of the invention defined by the claims. Several portable devices can be provided in the measurement system. Each portable device has its own energy source, such as a battery or a solar cell or other energy source. The measuring circuit(s) and the permanent magnet(s) can also be mounted on the rear wheel side of the bicycle. It may also be provided that the magnets are integrated into the material of the frame or the front fork.

The invention claimed is:

1. A method for measuring at least one physical parameter including at least one of speed and distance travelled by a bicycle during use thereof by a user, using at least one permanent magnet disposed on a frame portion or a fork for mounting a freely rotatable wheel and at least one measuring circuit with at least one magnetic sensor disposed on a wheel of the bicycle, the permanent magnet being disposed on the frame portion or the fork at a same distance from an axis of rotation of the wheel as the measuring circuit to be opposite to the measuring circuit at its passage during rotation of the wheel, comprising:
   a) setting the bicycle into movement with the wheel in rotation with the measuring circuit,
   b) detecting a passage of the magnetic sensor of the measuring circuit opposite to the permanent magnet by generating an induced voltage pulse at each passage of the measuring circuit in rotation,
   c) rectifying the voltage generated by the magnetic sensor using a rectifier and storing the rectified voltage on a smoothing capacitor to power the measuring circuit,
   d) calculating a physical parameter comprising at least one of the speed and the travelled distance of the bicycle in a calculation unit, which is clocked by a timepiece quartz oscillator of the measuring circuit, based on the induced voltage pulses received over time from the magnetic sensor using a value of a diameter of the wheel of the bicycle, and storing of at least one of measurements of speed and travelled distance obtained by integration into the calculation unit of the measuring circuit in a non-volatile memory of the measuring circuit, and
   e) wirelessly transmitting at least one measurement calculated in the calculation unit of the measuring circuit to a portable device carried by the user or on a portion of the bicycle using a signal transmission-reception unit linked to an antenna of the measuring circuit.

2. The measurement method according to claim 1, wherein
   a distance travelled by the bicycle over a determined period of time is calculated by integration into the calculation unit of the measuring circuit based on the induced voltage pulses received over time from the magnetic sensor, and
   the portable device is arranged to at least one of
      display an instantaneous speed measurement or measurements of at least one of speed and travelled distance on a display element of the portable device, and
      signal the measurements to the user by an audio signal using an audio element of the portable device.

3. The measurement method according to claim 2, wherein at least one travelled distance measurement is wirelessly transmitted to the portable device one of at a same time as the speed measurement and independently.

4. The measurement method according to claim 1, comprising
   f) as soon as a measurement of the speed is determined in the calculation unit, performing a direct transmission of the measurement of the speed to the portable device, and one of
   g) displaying an instantaneous speed measurement on a display element of the portable device, and
   h) signalling the measurement of the speed to the user by an audio signal using an audio element of the portable device.

5. The measurement method according to claim 1, comprising
   f) determining at least one of a maximum speed value and an average speed value in the calculation unit over a determined period of time and transmitted to the portable device, and one of
   g) displaying the at least one of maximum speed value and average speed value on a display element of the portable device, and
   h) signaling the at least one of maximum speed value and average speed value to the user by an audio signal using an audio element of the portable device.

6. The measurement method according to claim 1, comprising, as soon as a power voltage level on the smoothing capacitor goes below a first low power voltage threshold, deactivating the signal transmission-reception unit.

7. The measurement method according to claim 6, wherein before the power voltage level on the smoothing capacitor passes below a second power voltage threshold lower than the first low threshold, different calculations of at least one of speed and distance travelled by the bicycle are stored in the non-volatile memory of the measuring circuit.

8. The measurement method according to claim 1, wherein the measuring circuit also comprises an inclinometer to allow, by integration, calculating in the calculation unit at least one of an elevation performed by the bicycle and an instantaneous lateral inclination of the bicycle.

9. The measurement method according to claim 8, wherein the inclinometer is combined with a barometer for measuring atmospheric pressure.

10. The measurement method according to claim 1, comprising
    f) measuring a temperature of the ground using a temperature sensor of the measuring circuit, and
    g) transmitting the temperature measurement to the portable device.

11. The measurement method according to claim 1, comprising f) measuring an angular acceleration using an accelerometer of the measuring circuit, and g) transmitting of the angular acceleration measurement to the portable device.

12. The measurement method according to claim 1, comprising f) initially performing an operation of calibrating a diameter of the wheel of the bicycle and a fixing angle of the measuring circuit by transmitting parameterisation signals from the portable device to the measuring circuit.

13. The measurement method according to claim 1, wherein the measuring circuit communicates by radiofrequency signals using a transmission-reception unit of BLE type in an advertising mode with the portable device.

14. A system for measuring one of a speed and a distance travelled by a bicycle, configured to implement the measuring method according to claim 1, the measurement system comprising at least one permanent magnet disposed on a frame portion or a fork for mounting a freely rotatable wheel, at least one measuring circuit with at least one magnetic sensor disposed on the wheel of the bicycle, the permanent magnet being disposed on the frame portion or the fork at a same distance from an axis of rotation of the wheel as the measuring circuit to be opposite to the measuring circuit at its passage during the rotation of the wheel, and a portable device arranged to wirelessly communicate radiofrequency signals with the measuring circuit, wherein the measuring circuit comprises:

at least one magnetic sensor configured to detect passage in rotation in front of the permanent magnet and to generate an induced voltage pulse at each passage in front of the permanent magnet, a rectifier to rectify a voltage generated by the magnetic sensor and a smoothing capacitor to store the rectified voltage for powering the measuring circuit, a calculation unit, which is clocked by a timepiece quartz oscillator, configured to calculate a physical parameter comprising at least one of the speed and distance based on the induced voltage pulses received from the magnetic sensor using a value of a diameter of the wheel of the bicycle or to determine the passage times of the magnetic sensor opposite to the permanent magnet based on the induced voltage pulses provided by the magnetic sensor, and a transmission-reception unit linked to an antenna arranged to transmit at least one measurement of the physical parameters calculated in the calculation unit to a portable device carried by the user or on a portion of the bicycle or to transmit data relating to the passage times of the magnetic sensor opposite to the permanent magnet to the portable device so as to calculate in a processing unit of the portable device a physical parameter, and wherein measurements of speed and/or travelled distance obtained by integration into the calculation unit of the measuring circuit or into the processing unit of the portable device are stored in a non-volatile memory of the measuring circuit or in a non-volatile memory of the portable device.

15. The measurement system according to claim 14, wherein the measuring circuit is configured to be placed on one of a spoke, rim and tire of a front wheel of the bicycle,
the permanent magnet is configured to be placed on a front fork of the bicycle,
the portable device is a mobile phone or an electronic tablet to be carried by the user or fastened on a handlebar of the bicycle, and
at least one measurement performed in the measuring circuit is transmitted by radiofrequency signals of BLE type to the portable device to be displayed on a display element or signalled by an audio signal from an audio element to a user of the bicycle.

16. The measurement system according to claim 14, comprising at least two measuring circuits each having a magnetic sensor disposed on respective spokes of the wheel of the bicycle, on a rim, or on a tire of the wheel, the measuring circuits being disposed at 180° from each other on a same side or on two different sides of the wheel.

17. The measurement system according to claim 14, comprising at least two measuring circuits each having a magnetic sensor disposed at a same position on the wheel, but on two different sides of a rim or tire of the wheel.

18. The measurement system according to claim 14, wherein the measuring circuit also comprises at least one of an inclinometer and a barometer, which are configured to be calibrated by one of parameters transmitted by the portable device and directly by the portable device.

19. The measurement system according to claim 14, wherein the measuring circuit comprises a temperature sensor to measure a temperature of the ground to be transmitted to the portable device.

20. The measurement system according to claim 14, wherein the measuring circuit comprises an accelerometer for an angular acceleration measurement to be transmitted to the portable device.

21. A method for measuring at least one physical parameter including at least one speed and distance travelled by a bicycle during use thereof by a user, using at least one permanent magnet disposed on a frame portion or a fork for mounting a freely rotatable wheel and at least one measuring circuit with at least one magnetic sensor disposed on a wheel of the bicycle, the permanent magnet being disposed on the frame portion or the fork at a same distance from an axis of rotation of the wheel as the measuring circuit to be opposite to the measuring circuit at its passage during the rotation of the wheel, comprising:

a) setting the bicycle into movement with the wheel in rotation with the measuring circuit, b) detecting a passage of the magnetic sensor of the measuring circuit opposite to the permanent magnet by generating an induced voltage pulse at each passage of the measuring circuit in rotation, c) rectifying the voltage generated by the magnetic sensor using a rectifier and storing the rectified voltage on a smoothing capacitor to power the measuring circuit, d) determining passage times of the measuring circuit with the magnetic sensor opposite to the permanent magnet in a calculation unit, which is clocked by a timepiece quartz oscillator of the measuring circuit, based on induced voltage pulses provided by the magnetic sensor, e) wirelessly transmitting data relating to passage times of the magnetic sensor opposite to the permanent magnet to a portable device carried by the user or on a portion of the bicycle by a signal transmission-reception unit linked to an antenna of the measuring circuit, and f) calculating in a processing unit of the portable device the physical parameter and storing measurements of at least one of speed and travelled distance obtained by integration into the processing unit of the portable device in a non-volatile memory of the portable device.

22. The measurement method according to claim 21, wherein:
- a distance travelled by the bicycle over a determined period of time is calculated by integration in the processing unit of the portable device, based on the induced voltage pulses received over time from the magnetic sensor, and
- the portable device is arranged to one of
  - display an instantaneous speed measurement or measurements of one of speed and travelled distance on a display element of the portable device, and
  - signal the measurements to the user by an audio signal by an audio element of the portable device.

23. The measurement method according to claim 21, comprising
- g) determining at least one of a maximum speed value or an average speed value in the processing unit of the portable device over a determined period of time, and
one of
  - h) displaying the at least one of maximum speed value and average speed value on a display element of the portable device, and
  - i) signalling the at least one of maximum speed value and average speed value to the user by an audio signal using an audio element of the portable device.

24. The measurement method according to claim 21, comprising
- g) performing an operation of calibrating a diameter of the wheel of the bicycle and a fixing angle of the measuring circuit by the portable device based on raw data transmitted by the measuring circuit and on absolute measured values or over a calibrated course.

\* \* \* \* \*